NO PRINTED COPY OF SPECIFICATION IN OFFICE.
7992X
J. Pilling,
Water Wheel,
Patented Feb. 3, 1834.
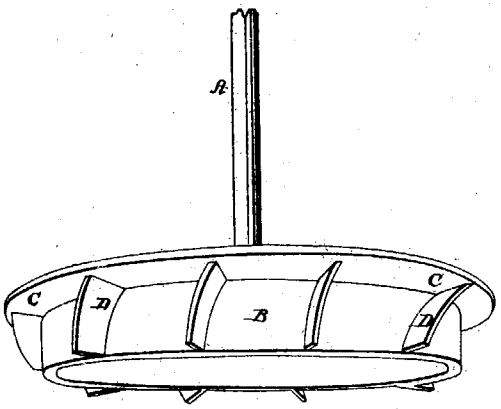
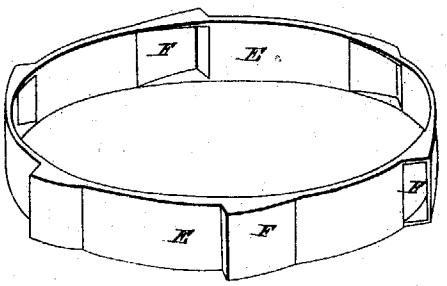
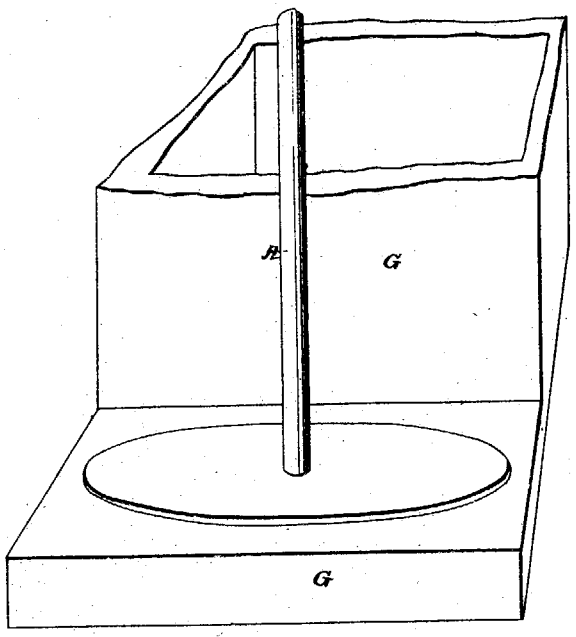

2/3/1834 7992X

Feb. 5. 1834

James Pilling of Waterford, Saratoga County, New York

The schedule referred to in these Letters Patent and making part
of the same containing a description in the words of the said James
Pilling himself of his improvement in the construction of a cast iron
water wheel denominated Pilling's horizontal sink curb wheel

---

Know all men by these presents that I James Pilling Sen. of the vill-
age of waterford, County of Saratoga and State of New York have
invented a new and useful improvement in the construction of a cast
iron water wheel which I shall distinguish by the name and style of
Pilling's horizontal sunk curb wheel which is constructed as follows.
Near upon the bottom end of a perpendicular shaft of suitable dimen-
sions is firmly fixed a cylinder in the form of a shallow inverted
cup of cast iron or other materials about three feet more or less in di-
ameter across the barrel or band which is about one foot deep the head
or cap of which forms a flanch projecting over the outside of the
said barrel or band about one foot more or less in proportion to the
intended power of the wheel. In the square or corner two angles of
which are formed by the projecting flanch and the periphery of said
barrel or band are fixed cast iron buckets straight or curved cast
entire or separate with the outer end extending to within half an
inch of the periphery of the said flanch and of the same depth of
the barrel or band. In the bottom of the wheel shaft is a female
center receiving a male one which is set firm in the foundation
work of a curb which surrounds the bottom and sides of the
said wheel being circular with a cast iron rim into which the per-
iphery of the said flanch is nicely fitted so as to be as near water
tight as possible and not produce friction in its motion. Around
the sides of the said curb are several openings the same depth of
the wheel and about six or eight inches wide in which extend
conducting [illegible] of the same depth about eighteen inches long through
which 7992x which the head water passes in a tangent horizontally upon the buckets
of the wheel at intermediate distances between the said inlets are
openings in the bottom of the curb through which the water passes
in its escape from the buckets around the interior of the curb is
made a form or screw either round or square into which the water
passes from the penstock through said inlets upon the buckets as above-
and being controlled by a slide or stop which closes the channel in the
curb on one side of its entrance from the penstock it passes round
in an opposite direction calculated to enter through said inlets in
curved lines upon the buckets of the wheel where having exerted its
force upon the buckets a part flows back and passes down the exhaust
or waste gate in the bottom immediately back of its entrance through
said inlets and the balance of the water passes on and escapes at
the next bottom opening. The outside box or curb may be made
of plank and bolted or screwed to the rims at the top and bottom
the sides made of staves or otherwise or may be made of iron cast
whole or in parts. The penstock gate may be the ordinary gate or
a wicket made to turn upon centre bearings by means of a socket
and perpendicular key shaft with a crank lever upon its upper end.
Underneath the curb if necessary a trough may be fixed to carry the
waste water any direction required. The upper end of the wheel
shaft may run in boxes as usual from which power may be carried
by coupling wheels, bands or otherwise. That portion or part of the
improvement which I claim as my discovery or invention is first
The method of introducing the water upon and discharging it from
the wheel by the arrangements as above described. Secondly the com-
bined arrangement of the curb and wheel by which the latter is
buoyed up by the water [illegible] action upon the under side of the
planks and the bottom step relieved from the friction without
any waste of water, loss of power or extra expense of machinery —
Exd. Witness [illegible] 28th September 1833
St. T. Witnesses
Walter Hunt
John G. Kelly.

[illegible]

Patented 3d February 1834 (Copy'd)